United States Patent [19]

Fredenburg et al.

[11] Patent Number: 4,470,729

[45] Date of Patent: Sep. 11, 1984

[54] COTTON GIN SUCTION PIPE

[75] Inventors: John C. Fredenburg; Charlie F. Hunter, both of Lubbock, Tex.

[73] Assignee: Anderson & Bigham Sheet Metal Works, Inc., Lubbock, Tex.

[21] Appl. No.: 154,795

[22] Filed: May 30, 1980

[51] Int. Cl.³ .............................................. B65G 53/52
[52] U.S. Cl. .................................................... 406/116
[58] Field of Search ............... 406/113, 115, 116, 151, 406/152, 164

[56] References Cited

U.S. PATENT DOCUMENTS 3,260,550  7/1966  Miller .................................. 406/115
3,262,742  7/1966  Sipe et al. ........................... 406/116

Primary Examiner—Jeffrey V. Nase
Attorney, Agent, or Firm—Wendell Coffee

[57] ABSTRACT

A suction pipe adjacent to a cotton gin is power moved along a straight beam when a swing pipe leg is moved at an angle from vertical by an operator. Two rollers are driven by a motor. The motor is controlled by an angle activated switch and two limit switches on the ends of the beam.

6 Claims, 4 Drawing Figures

COTTON GIN SUCTION PIPE

BACKGROUND OF THE INVENTION

1. Field of the Invention

This invention relates to cotton gin suction pipes and more particularly to power assisted manual operation of traveling telescope pipe used in moving cotton.

2. Description of the Prior Art

A telescope suction pipe was typically used on the outside edge of a cotton gin to pull cotton via a vacuum suction pipe from mobile cotton trailers or modules. An operator manually swung and pushed the telescope suction pipe over and through the cotton in the trailer. This was very hard work. One advancement included a traveling telescope. I.e., a horizontal leg of the suction pipe extending from the cotton gin could move back and forth. Then, the universal joint connecting the horizontal leg and vertical leg could be moved back and forth and it was not necessary to angle the vertical leg so great an angle from vertical to reach the cotton in the trailer. Units according to this design included a single roller which rolled along a straight beam so that the universal joint moved in an arc.

With the advancement of technology, remote controlled operations were developed whereby an operator would control a traveling telescope while sitting in a climate controlled room. However, remote controlled systems did not meet with universal acceptance because of the expense involved.

Mission Sheet Metal Company of Fresno, Calif., a division of Bush Hog-Continental Gin Company, Prattville, Ala. markets an electrically powered transverse traveling telescope having a universal jointed telescope head using a design whereby the horizontal leg is above an I beam frame. The Mission design has a telescoped horizontal leg so that the universal joint moves in a straight line.

SUMMARY OF THE INVENTION

1. New and Different Function

We have invented an electric powered cotton gin suction pipe system to assist an operator in physically moving a traveling telescope that transports cotton from a container or module to inside a cotton gin. The operator only swings the pipe from side to side of the container and not from end to end in addition. Basically, our system has an electric motor which drives rollers riding above the beam. Whether the rollers are driven in one direction or not depends upon the angle that the suction pipe makes with vertical. Our system is far superior economically to an automated, remote operated cotton gin suction.

Therefore, it may be seen that the total function of our powered traveling telescope is far greater than the sum of the functions of the individual brackets, bolts, switches, etc.

2. Objects of this Invention

An object of this invention is to suck cotton into a cotton gin.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
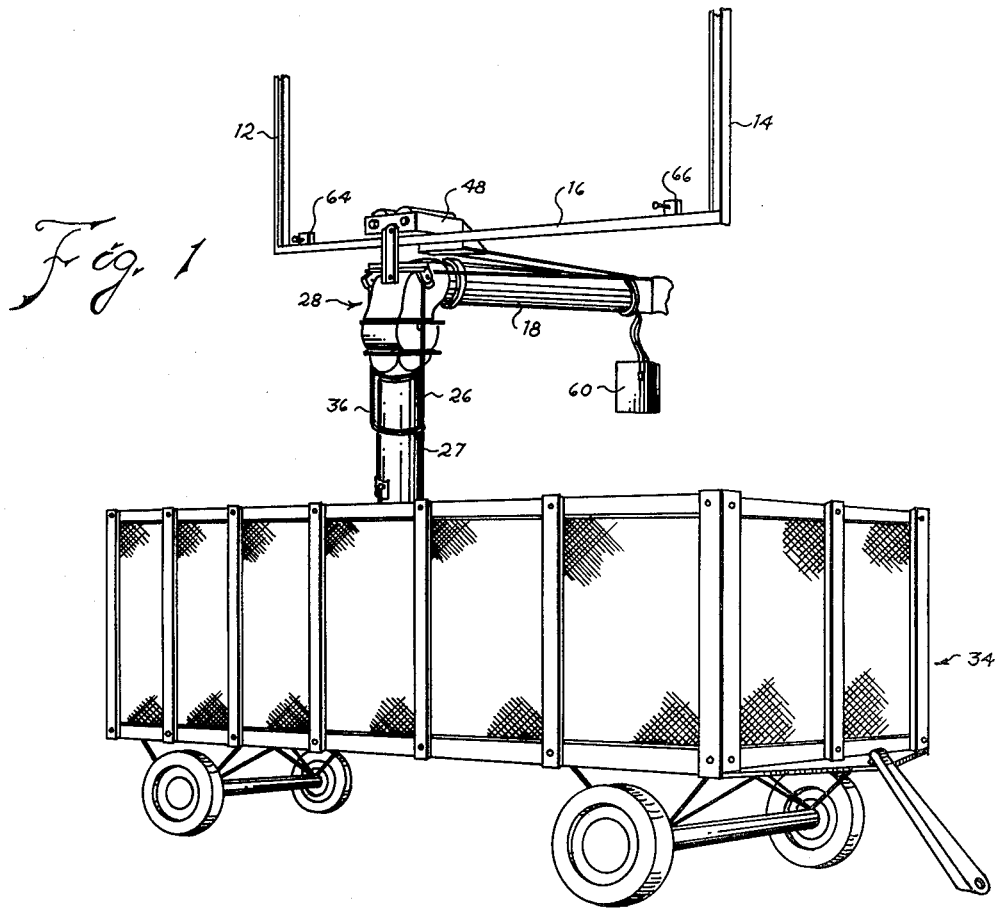
FIG. 1 is a perspective view of an embodiment of our invention.
Figure 4:
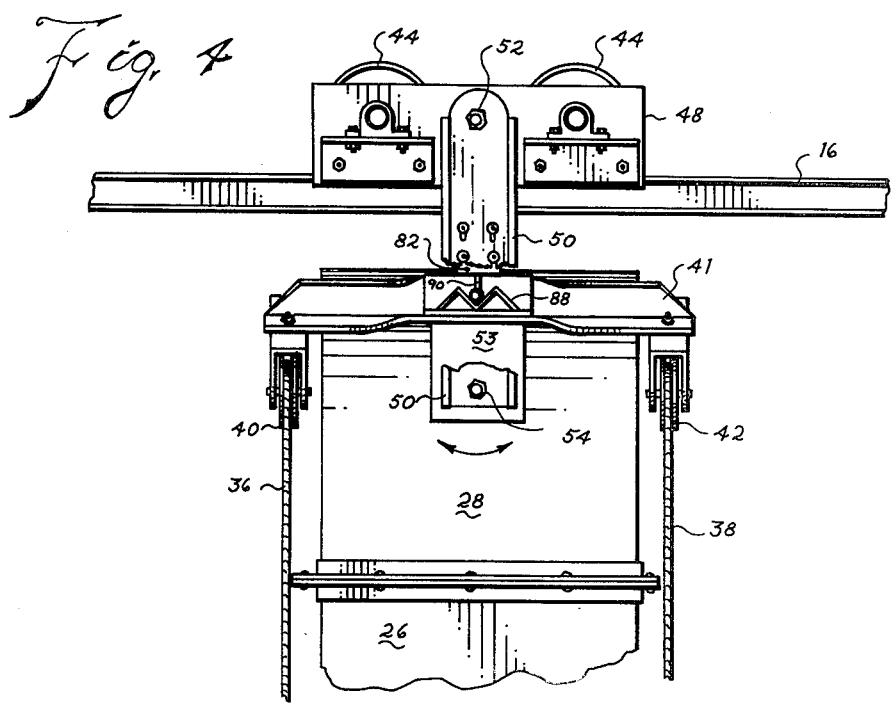
FIG. 4 is a front view thereof as seen at line 4—4 of FIG. 3 with parts broken away for illustration.
Figure 3:
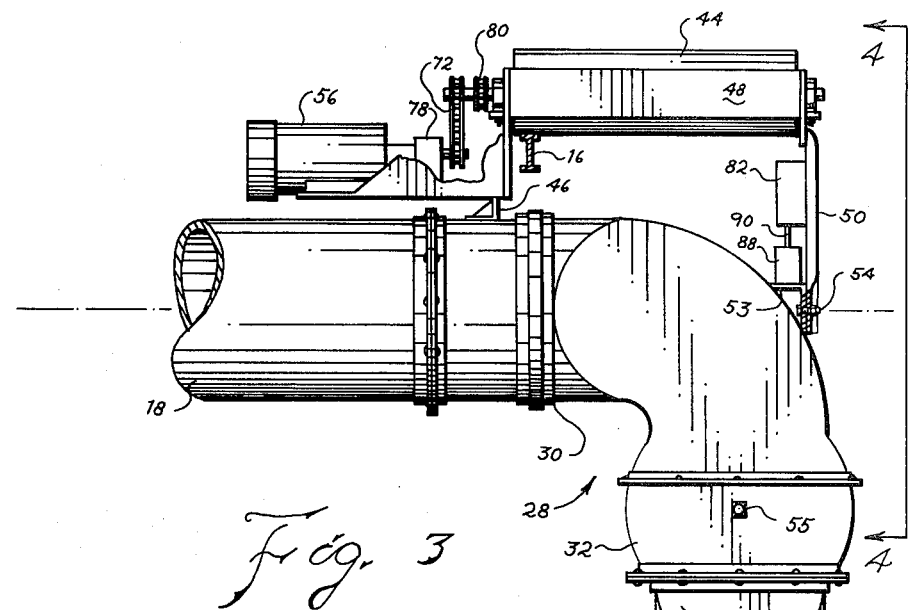
FIG. 3 is a partial side view thereof, partially broken away.
Figure 2:
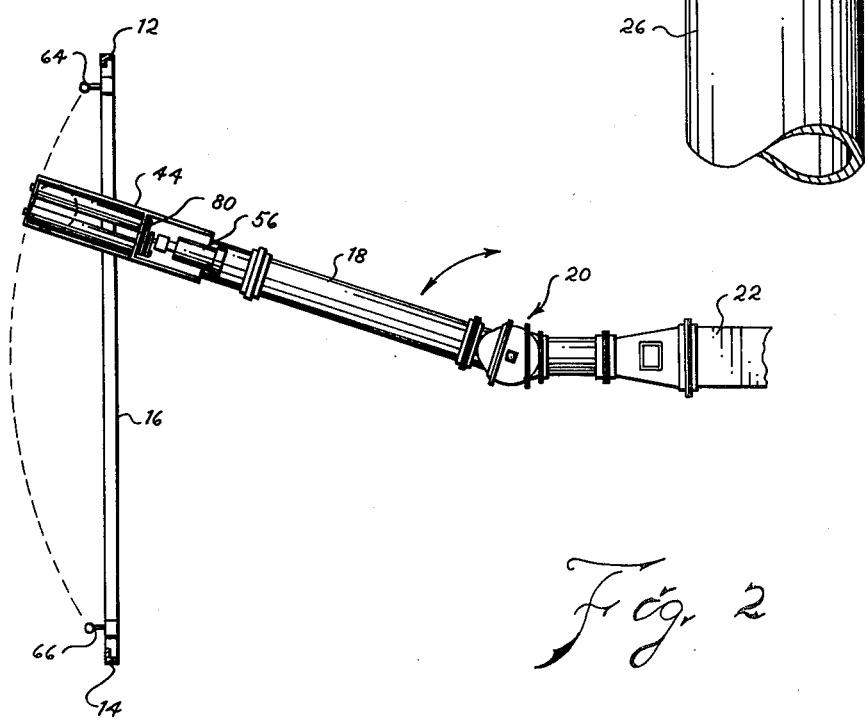
FIG. 2 is a top plan view of a cotton gin suction pipe and pivotal end according to our invention.

Referring to the drawings and more particularly to FIGS. 1 and 2, straight horizontal beam 16 is suspended from an overhead structure of the cotton gin by hangers 12 and 14. Horizontal leg 18 extends outward from fixed pivot connection 20 which connects to fixed leg 22. The fixed leg 22 is supported by and extends through the side of the cotton gin structure (not shown). The horizontal leg 18 swings in an arc under the straight beam 16 from the fixed pivot connection 20.

Vertical swing leg 26 connects to horizontal leg 18 by universal joint or telescope head 28. Swivel joint 30 and pivot connection 32 allow the vertical leg 26 to swing at any angle. Cotton trailer 34 containing a full load of cotton is driven under vertical swing leg 26 so that an operator standing in trailer 34 can get the swing leg 26 to the cotton which is sucked through the pipes into the gin. Handle pipe 27 telescopes over swing leg 26, thus giving the telescope its name.

The vertical length of the telescope is controlled manually by telescoping the pipe 27 to the length needed. Ropes 36 and 38 are attached to the top of the pipe 27. Weights (not shown) on the ropes balance the weight of the handle pipe 27. The two ropes are connected via pulleys 40 and 42 to the counterbalancing weights.

A pair of metal rollers 44 are journaled within frame 48. The rollers 44 roll and slide across straight beam 16 allowing an operator to move the vertical swing leg 26 from the front end of trailer 34 to the back end. Bracket 46 is attached as by welding to the distal end of the horizontal leg 18. The frame 48 is attached as by bolting to the bracket 46. Thus one end of the frame 48 is attached to the horizontal pipe 18. More exactly, the frame supports the horizontal leg 18 and the telescope head. I.e., the rollers 44 are supported by the beam and ride above the beam so that the distal end of the horizontal leg 18 of the suction pipe and the telescope head are then supported from the frame 48. The non-rotating portion of the horizontal leg 18 is supported by the bracket 46. The telescope itself is swung or supported by end link or suspension bracket 50. The top of the suspension bracket 50 is securely and fixedly attached to the frame 48 by bolt 52 which is securely attached so that it is rigidly attached thereto.

The lower end of the bracket 50 is pivoted to the telescope head by pivot bolt 54. Therefore, it may be seen that the telescope head or universal joint is free to rotate about a horizontal axis, this horizontal axis being the axis of horizontal leg 18 and also the axis of the pivot bolt 54 which is coaxial with the horizontal leg 18. The swing leg 26 will pivot about pivot bolt 55 which is horizontal. Therefore, it may be seen that with these two axes that the swing leg 26 can be moved in any direction. Therefore, the telescope head 28 is in fact a universal joint. Electric motor 56 is mounted directly behind the rollers 44 on the frame 48. The motor 56 is connected to the rollers by a chain drive system. Electrical wiring extends from motor 56 over horizontal leg 18 down to an electric switch box 60. Stop or limit switches 64 and 66 mounted on beam 16 are connected to switch box 60 by electrical wiring. The limit or stop switches 64 and 66 prevent the motor 56 from driving the telescope head 28 into the hangers 12 and 14.

The frame 48 moves in an arc and the beam 16 is a chord of that arc. The rollers are as long as the distance from the arc to the chord.

Gear reducer 78 is connected to the motor 56 to provide the proper drive speed. Drive chain 72 of the drive chain system interconnects the motor drive sprocket and the roller sprocket of one of the rollers 44. Roller chain 80 connects the two rollers 44.

Travel switch 82 is mounted to the suspension bracket 50. Travel switch 82 is connected electrically with switch box 60 through electrical wiring (not shown). Travel switch activator cam 88 is mounted on telescope head 28 immediately below the travel switch 82.

Switch rod 90 depends from the travel switch 82. A cam follower on the end of the switch rod 90 bears against the V-shaped cam 88. Whenever the vertical swing leg 26 is moved to the left or right along the straight beam 16, the V-shaped activator cam 88 will move. The cam 88 is attached to the top of clip 53 which is to say it is above the axis of the pivot bolt 54 and above the axis about which the telescope head 28 rotates relative to the horizontal leg 18. More precisely, the cam will be mounted above the pulley arm 41 which carries the rope pulleys 40 and 42, and the pulley arm 41 itself is attached to the top of the clip. Therefore, it may be seen that as the swing leg 26 moves from side to side this will move the V-shaped cam 88. Movement of the V-shaped cam 88 will move switch rod 90. The switch rod 90 will close travel switch 82 causing motor 56 to drive rollers 44 in the opposite direction the travel switch rod 90 had moved which will be the direction at which the bottom of the handle pipe 27 is moved. I.e., the telescope head 28 will follow the bottom of the handle pipe 27. Four slots on the suspension bracket 50 by which travel switch 82 is mounted are long enough to allow the travel switch and its rod 90 to be moved up or down. This is an adjustment which controls the angle which leg 26 must swing to activate the power assists, this it is a sensitivity adjustment.

As an aid to correlating the terms of the claims with the exemplary drawing, the following catalog of elements is provided:

| 12 | hanger | 46 | bracket |
| 14 | hanger | 48 | roller frame |
| 16 | straight beam | 50 | suspension bracket |
| 18 | horizontal leg | 52 | bolt |
| 20 | fixed pivot connection | 53 | clip |
| 22 | fixed leg | 54 | pivot bolt |
| 26 | vertical swing leg | 55 | pivot bolt |

-continued

| 27 | handle pipe | 56 | motor |
| 28 | telescope head | 60 | switch box |
| 30 | swivel joint | 64 | stop switch |
| 32 | pivot connection | 66 | stop switch |
| 34 | cotton trailer | 72 | drive chain |
| 36 | rope | 78 | gear reducer |
| 38 | rope | 80 | roller chain |
| 40 | pulley | 82 | travel switch |
| 41 | pulley arm | 88 | switch cam |
| 42 | pulley | 90 | switch rod |
| 44 | metal rollers | | |

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:

1. A cotton gin suction pipe system including
   a. a fixed leg,
   b. a fixed pivot connection on the fixed leg,
   c. a horizontal leg pivoted to the fixed leg by said pivot connection,
   d. a vertical swing leg attached to the horizontal leg by
   e. a universal joint, and
   f. a horizontal straight beam;
   wherein the improvement comprises:
   g. a frame having
   h. a suspension bracket,
   i. two rollers journaled in the frame,
   j. said two rollers adapted for rolling and sliding on top of said straight beam,
   k. a motor mounted on said frame,
   l. drive chains and roller chains interconnecting said motor and rollers for rotating said rollers to move the frame along the beam,
   m. said horizontal leg and said universal joint suspended from the suspension bracket beneath said straight beam, and
   n. said horizontal leg having a fixed length so that said frame is always a constant distance from said fixed pivot connection.

2. The invention as defined in limitations (a) through (n) of claim 1 with additional limitations of
   o. said universal joint pivoted to the suspension bracket of the frame,
   p. a travel switch attached to the frame suspension bracket,
   q. a switch arm extending from said switch,
   r. an activator cam mounted on said universal joint,
   s. said switch arm in operative contact with the activator cam so that angular movement of said vertical swing leg will move the cam and thus the switch arm,
   t. said switch electrically connected to said motor to activate the motor to rotate said rollers in a direction so that the frame travels in the direction of the swing leg.

3. The invention as defined in limitations (a) through (t) of claim 2 with an additional limitation of u. said travel switch mounted in an adjustable position so that the distance from the switch to the cam may be regulated, thus v. regulating the sensitivity of the system.

4. The invention as defined in limitations (a) through (v) of claim 3 with an additional limitation of w. said cam having a V-shaped working base.

5. The invention as defined in limitations (a) through (w) of claim 4 with an additional limitation of x. said horizontal straight beam having two ends, y. a stop switch at each end of said straight beam, z. said stop switch connected to said motor so that when the frame contacts the stop switch it halts rotation of the motor to move the frame toward said stop switch.

6. The invention as defined in limitations (a) through (z) of claim 5 with an additional limitation of aa. said frame moving in an arc with said fixed pivotal connection as the center of said arc, bb. said horizontal straight beam being a chord of said arc, and cc. said rollers being as long as the distance between said arc and said chord.

* * * * *